United States Patent Office 3,516,802
Patented June 23, 1970

3,516,802
CONTINUOUS PROCESS FOR THE SYNTHESIS
OF DIFLUORAMINE
John R. Lovett, Edison, and Edwin A. Schmall, Springfield, N.J., assignors to Esso Research and Engineering Company, a corporation of Delaware
No Drawing. Filed Nov. 21, 1960, Ser. No. 70,856
Int. Cl. C01c 1/16, 1/00
U.S. Cl. 23—356                                        3 Claims This invention relates to a process for making difluoramine. Specifically, this invention concerns making difluoramine by contacting an organo mercapto compound with tetrafluorohydrazine. More particularly, this invention concerns a continuous process for making pure difluoramine by contacting a hydrocarbon mercapto compound with tetrafluorohydrazine for relatively short periods of time.

In recent years a great deal of effort has been expended in trying to find materials which are themselves strong oxidizing agents and/or materials which can be used as intermediates to obtain strong oxidizing agents. One such compound is difluoramine. It can be used as a storable liquid oxidizing agent in propellant compositions, as well as an agent for adding —$NF_2$ groups to organic as well as inorganic compounds. Heretofore, difluoramine has been prepared in a batch-type process by contacting tetrafluorohydrazine with thiophenol for relatively long periods of time, e.g. about 16 hours. This process has proven to be unsatisfactory for several reasons. First, the long period of time required for the reaction is inconvenient. Second, and perhaps more important, the difluoramine product formed reacts with the disulfide by-product, thereby significantly lowering the yield. Third, the difluoramine products were not obtained pure.

One object of this invention is to provide a continuous process for the preparation of difluoramine in high yields and with high purity. Another object is to provide pure difluoramine which can be used to make various organic and inorganic difluoramine derivatives. Still another object is to provide a novel method for recovery of difluoramine. Other objects of this invention will be apparent from the following description.

In a preferred embodiment of this invention, tetrafluorohydrazine is contacted with an organo mercapto reducing agent for a time sufficient to form some difluoramine, but not long enough to decompose the difluoramine product, at a temperature of 0 to 100° C., a molar ratio of tetrafluorohydrazine to organo mercapto compound of 1:10 to 1:2 and at atmospheric pressure. The difluoramine product can be recovered by condensing it in a cold trap at a temperature of −40° to −178° C. Alternatively, and in accordance with one embodiment of applicants' invention, the difluoramine gas product can be recovered at room temperature by selectively adsorbing it in an oxygenated hydrocarbon solvent. The adsorbed difluoramine can be separated from the selective solvent by conventional distillation methods, or when used as a reagent can be stored in the solvent which can be used as a solvent for further reactions.

The organo mercapto compounds which can be used in applicants' invention comprise both alkyl and aryl hydrocarbons. Alkyl mercapto compounds containing 1 to 20 carbon atoms and preferably 4 to 12 carbon atoms can be used; for example, butane thiol, heptane thiol, dodecane thiol, etc. Aryl hydrocarbons containing 6 to 12 carbon atoms, for example thiophenol and mercapto naphthylenes can also be used. The organo mercapto compounds of this invention may contain one or more mercapto groups and halogen substituents. The aryl compounds can have lower alkyl group substituents as well. Compounds coming within the scope of this invention include 2-chloro-4-mercapto butane, 3-bromo-6-mercapto heptane, 2,4-dimethyl-1,3-dimercapto benzene, 4-ethyl-1-mercapto benzene, 2,6-dibromo-1,4-dimercapto naphthylene 2,6-dimethyl-1-mercapto naphthylene and the like. Though the other mercapto compounds may be used, thiophenol is preferred because it is liquid at room temperature, high boiling, inexpensive, and readily available. Also, the diphenyl disulfide formed as a by-product of the reaction precipitates and may be easily removed.

The organo mercapto compound can be used in pure form or with an inert solvent hydrocarbon diluent. Diluents such as pentane, hexane, heptane, cyclohexane, decane and the like can be used. The ratio of organo mercapto compound to diluent can be 1:0.1 to 1:2 parts by weight, and is not critical. Generally, however, the organo mecapto compound is used in concentrated form.

The tetrafluorohydrazine reactant can be used as a pure gas, as a crude commercially available gas, or diluted with various inert carrier gases. Inert gases such as nitrogen, argon, and helium may be used at a ratio of tetrafluorohydrazine to diluent of 1:0.1 to 1:10 by volume. Usually, the concentrated commercially available tetrafluorohydrazine is used. However, in a commercial operation tetrafluorohydrazine would be used with an inert carrier gas. The reaction is carried out with the organo mercapto compound in the liquid phase and the tetrafluorohydrazine in the gas phase. Temperatures of 0° to 100° C. can be used, but temperatures of 20° to 60° C. are preferred. More preferably, the reaction is carried out at a temperature of 50° to 60° C. The temperature used will depend on the mercapto compound used and contact time. The pressure is not critical and may vary from slightly subatmospheric to slightly superatmospheric. For economic reasons, atmospheric pressure is preferred. The contact time is critical and should be sufficient so that most of the tetrafluorohydrazine is converted to difluoramine, but not long enough to allow any appreciable amount of the difluoramine product to react with the diphenyl disulfide by-products which decompose the difluoramine. Contact times of up to 2 hours, for example 5 to 100 minutes, can be used with contact times of 10 to 50 minutes being preferred. The volume of the reactor and the flow rate will determine the contact time. For the purposes of this description, contact time is defined as the volume of the liquid mercapto compound (in cc.) in the reactor divided by the flow rate of gas in cc./min. at reactor temperature. For example, in a 100 cc. reactor containing 50 cc. of thiophenol flow rates of tetrafluorohydrazine of 0.5 to 5 cc. per minute are preferred; this corresponds to contact times of from 100 to 10 minutes. However, flow rates of 0.1 to 10 cc. per minute can be used, depending on the reactor volume. The organo mercapto reducing agent is generally in molar excess as related to the tetrafluorohydrazine; molar ratios of tetrafluorohydrazine to organo mercapto compound of 1:10 to 1:2 can be used, preferably ratios of 1:5 to 1:2 are used.

A suitable reactor which is not attacked by the reactants and which can be heated to the desired reaction temperature is used. The reactor is provided with a means whereby the difluoramine gaseous product can be continuously removed and condensed in a cold trap maintained at a temperature of −40 to −178° C. Alternatively, because of the extreme solubility of $HNF_2$ in oxygenated solvents, the difluoramine product can be selectively adsorbed in an oxygenated solvent at room temperature. For example, aliphatic ethers containing 2 to 6 carbon atoms can be used, such as diethyl ether and methyl ethyl ether. Aliphatic diethers of ethylene glycol containing 2 to 8 carbon atoms and heterocyclic ethers can be used, e.g.

monoglyme, diglyme and tetrahydrofuran. The preferred solvents are those which are cheapest and suit the storage needs of the product.

In a preferred embodiment of this invention, the reactor is charged with a concentrated phenyl mercapto compound in the liquid phase and contacted with gaseous tetrafluorohydrazine at a temperature of 20 to 60° C. at atmospheric pressure, at a ratio of tetrafluorohydrazine to phenyl mercapto compound of 1:5 to 1:2 and at a flow rate of .5 to 5.0 cc. per minute. The contact time is maintained between 10 and 50 minutes. The difluoramine gaseous product is continuously removed and condensed in a cold trap maintained at a temperature of about −130° C. The condensed product is substantially pure difluoramine and contains no unreacted tetrafluorohydrazine or organo mercapto by-products.

In another preferred embodiment of applicants' invention, the gaseous difluoramine product is selectively adsorbed at room temperature in an oxygenated solvent such as ethylene glycol diether, for example monoglyme or diglyme.

During the reaction the organo mercapto compounds are oxidized to disulfides which precipitate in situ and may be easily removed. Since the difluoramine product is continuously removed, there is little opportunity for the difluoramine product to undergo a reaction with the disulfides which cause in the batch process decomposition of the difluoramine product and substantial loss in yield.

The pure difluoramine made in accordance with the invention can be used as a storable liquid oxidizing agent for propellant compositions. It can also be used as an intermediate to add $-NF_2$ groups to organic as well as inorganic, compounds by methods known in the art. These derivatives may be used as monopropellants or as oxidizing agents in propellant compositions containing boron fuels. The difluoramine compounds may also be used as fluorinating agents to add fluorine to various organic compounds.

The following example illustrates applicants' invention.

EXAMPLE

A 100 cc. Pyrex reactor was evacuated and flushed with dry nitrogen gas, and charged with 50 cc. of thiophenol. The reactor was connected to a cold trap which was cooled with liquid nitrogen to about −178° C. Concentrated tetrafluorohydrazine was bubbled through the thiophenol at approximately 0.5 cc. per minute, with the reaction temperature maintained at 50°–60° C. The reaction commenced as soon as the two reactants were brought into contact and was continued for about 350 minutes with a contact time of 100 minutes, and a molar ratio of tetrafluorohydrazine to thiophenol of about 1:10. Substantially pure difluoramine (0.5 gram) was collected in the cold trap, representing a yield of 70 wt. percent based on 100% conversion of the tetrafluorohydrazine. The product was only contaminated by a trace of $SiF_4$. This contamination can be eliminated by using a metal reactor.

The organo mercapto compound is partially used up during the reaction and forms an organo disulfide which precipitates. The difluoramine product is continuously removed as a gas. During the reaction additional organo mercapto compound can be added to replace the amount used up and the organo disulfide may be intermittently removed as it is formed. In order to prevent decomposition of the difluoramine product, it is necessary that the amount of time that it is in the presence of the organo disulfide be maintained at a minimum. In accordance with one embodiment of applicants' invention, during the reaction additional organo mercapto compound is added as it is used, difluoramine product is continuously removed as formed, and the organo disulfide is periodically removed.

It is not intended to restrict the present invention to the foregoing example, but rather it is only to be limited by the appended claims.

What is claimed is:

1. The continuous process for making difluoramine, which comprises reacting tetrafluorohydrazine gas under about 1 atmosphere pressure at 0° to 100° C. with a liquid organo mercaptan selected from the group consisting of alkyl mercaptans having 1 to 20 carbon atoms per molecule and aryl mercaptans having 6 to 12 carbon atoms per molecule by contacting said gas with the liquid mercaptan to convert said gas to difluoramine gas in a contact time of about 5 to 100 minutes, the difluoramine gas having a flow rate of about 0.1 to 10 cc. per minute per 50 cc. of the liquid mercaptan thus contacted, and the molar ratio of the tetrafluorohydrazine to the mercaptan being 1:10 to 1:2, removing from the liquid mercaptan the gaseous product containing difluoramine gas as it is formed to minimize the time of contact of the difluoramine with the liquid mercaptan and with the organo disulfide product precipitated in the liquid mercaptan, and recovering the difluoramine product.

2. The process of claim 1, in which the difluoramine gaseous product removed from the liquid mercaptan is condensed at a temperature of −40° to −178° C.

3. The process of claim 1, in which the difluoramine gaseous product is separated and recovered by being selectively dissolved in an ether solvent.

References Cited
UNITED STATES PATENTS

| | | | |
|---|---|---|---|
| 3,228,747 | 1/1966 | Groves et al. | 23—190 XR |
| 3,294,495 | 12/1966 | Lawton et al. | 23—356 |
| 3,357,803 | 12/1967 | Freeman et al. | 23—356 |

BENJAMIN R. PADGETT, Primary Examiner

U.S. Cl. X.R.

23—190; 149—109